United States Patent [19]

Krumins et al.

[11] Patent Number: 4,627,586
[45] Date of Patent: Dec. 9, 1986

[54] THRUST VECTORING APPARATUS FOR MANEUVERING MISSILE IN FLIGHT

[75] Inventors: Maigonis V. Krumins, Bethesda; Leon H. Schindel, Rockville, both of Md.

[73] Assignee: The United States of America as represented by the Secretary of the Navy, Washington, D.C.

[21] Appl. No.: 665,866

[22] Filed: Oct. 29, 1984

[51] Int. Cl.⁴ ............................................. F42B 15/033
[52] U.S. Cl. ..................................... 244/3.21; 60/230; 239/265.19
[58] Field of Search ........................ 244/3.22, 3.21, 3.3, 244/3.1, 169, 76 J; 60/230; 239/265.11, 265.19

[56] References Cited

U.S. PATENT DOCUMENTS

| | | | |
|---|---|---|---|
| 3,040,523 | 6/1962 | Price | 60/230 |
| 3,647,161 | 3/1972 | Draim | 244/3.21 |
| 3,726,480 | 4/1973 | Miltenberger | 239/265.19 |
| 3,907,222 | 9/1975 | McComas | 239/265.19 |
| 3,946,556 | 3/1976 | Catterfeld | 239/265.19 |
| 3,986,683 | 10/1976 | Ellison | 244/3.22 |
| 4,037,405 | 7/1977 | Huenniger et al. | 60/230 |
| 4,337,911 | 7/1982 | Flatau | 244/3.1 |

Primary Examiner—Charles T. Jordan
Attorney, Agent, or Firm—Kenneth E. Walden

[57] ABSTRACT

Thrust vectoring apparatus for a missile for imparting bank and pitch to the missile for maneuvering it in flight. The missile is provided with a generally rectangular jet exhaust opening in which is pivotally mounted a pair of two-dimensional plugs which define a plug nozzle for the opening. The plugs, disposed on opposite sides of a vertical longitudinal plane of the missile, are adapted to be selectively and independently pivoted in response to a control mechanism acting in response to guidance command signals for banking and pitching the missile for maneuvering it in flight.

11 Claims, 7 Drawing Figures

THRUST VECTORING APPARATUS FOR MANEUVERING MISSILE IN FLIGHT

BACKGROUND OF THE INVENTION

Missiles that are deployed are generally of axisymmetric geometry. Various techniques have been devised to provide thrust vectoring capability for these missiles. One is to swivel the nozzle relative to the missile body and thus point thrust in the direction desired. The drawback of this method is that relatively large pieces of equipment have to be moved, requiring large and complex actuating devices, as well as excessive power to move them. Another method employed on conventional bell nozzles is to separate the flow over a portion of the nozzle wall by use of jets. This has the disadvantage that fine adjustments in magnitude of the side thrust are difficult to obtain since the extent of the separation can not be predictably varied with the jet strength. It is an efficient method, however, in applications where on-off thrust vectoring is required rather than controlled variability. Jet vanes at the exit plane of a nozzle have been used in the past to direct the flow in a preferred direction and thus provide thrust vectoring. The erosion performance and survival of these vanes in the high temperature exhaust gas of an advanced, high temperature missile can be a problem, and heavy bell nozzles are required to achieve thrust efficiency.

It is desired to provide a two-dimensional split plug in a generally rectangular jet exhaust gas opening of a missile to define a plug nozzle.

It is desired to provide the two parts of the split-plug with selective independent pivotal movement to positions necessary for thrust vectoring of exhaust gases to accomplish roll or bank and pitch on the missile for maneuvering it in flight.

SUMMARY OF THE INVENTION

It is, therefore, an object of the invention to provide effective thrust vectoring of a missile for maneuvering it in flight.

It is another object of the invention to provide a split two-dimensional plug in the jet exhaust opening of a missile for accomplishing bank and pitch for maneuvering it in flight.

It is still another object of the invention to provide a split two-dimensional plug means which substantially fills a rectangular jet exhaust gas opening to define a plug nozzle whereby turning of the plugs vectors thrust of the exhaust gases passing therethrough.

It is yet another object of the invention to provide a jet exhaust opening with plugs on either side of the missile's centerline or vertical plane where each plug is independently and selectively pivotal for thrust vectoring of exhaust gases to bank and pitch the missile for maneuvering it in flight.

It is still a further object of the invention to cause a nonaxisymmetric missile, such as a waverider, to bank and pitch for maneuvering in space.

Other objects of the invention will become apparent to one upon reading the specification in conjunction with the drawings.

DETAILED DESCRIPTION OF THE INVENTION

In long range high lift-to-drag body configurations for missiles being designed for future military uses, circular cross sections may give way to other shapes. Circular cross sections are no longer the most advantageous packaging. Two-dimensional jet exhaust nozzles, for instance, having rectangular cross-section may then represent more efficient use of the available volume and provide more flexibility in design than the standard, axisymmetric bell nozzles. The invention herein provides thrust vectoring by prescribing dual, split, or side-by-side plugs, independently pivotal mounted on axes transverse of the nozzle opening to attain bank (or roll) and pitch on a missile for maneuvering it during flight.

Figure 1:
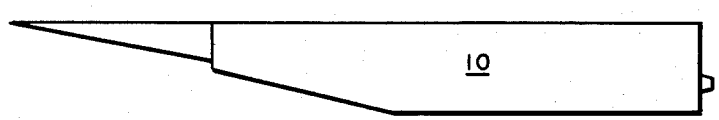
FIG. 1 is a side view of a waverider-type missile in which the invention may be employed.
Figure 2:
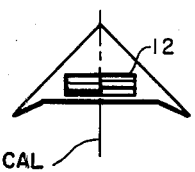
FIG. 2 is an aft end view of the missile shown in FIG. 1, further illustrating a vertical plane extending longitudinally of the missile.
Figure 3:
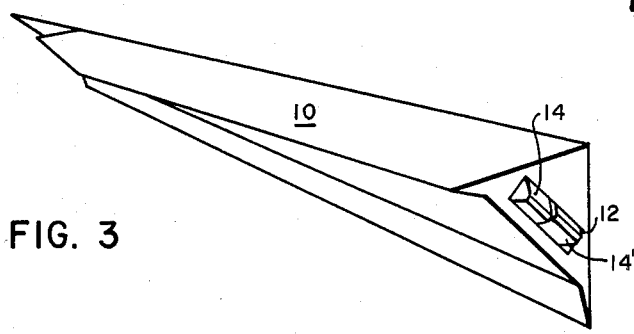
FIG. 3 is a perspective view of the aft end of the missile illustrating it in bank to turn position.
Figure 4:
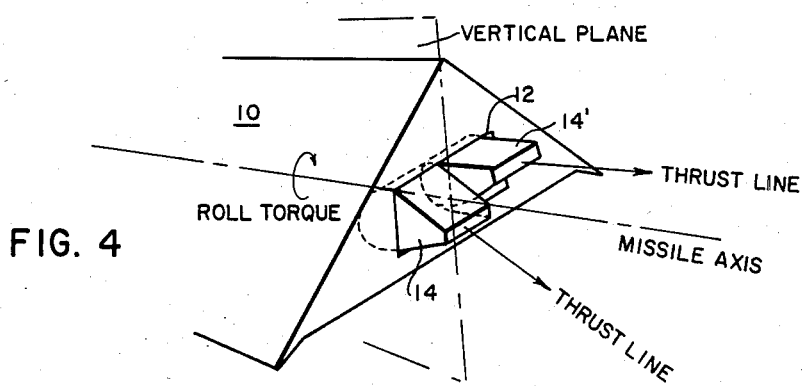
FIG. 4 is another perspective view showing the aft end of the missile illustrated in FIG. 1 with the plugs in position for banking the missile for a right turn.

Referring now to the drawings, there is illustrated in FIGS. 1, 2, and 3, views of a missile 10 having a special body shape designed for high lift yet low drag for employing the invention. This missile configuration is illustrated as provided with a jet exhaust gas opening 12 of a generally rectangular cross section in which a pair of two-dimensional plugs of aerodynamic shape (truncated teardrop) 14 and 14' are located in side by side adjacency for vectoring jet exhaust gas to cause the missile to roll and pitch for maneuvering in space. It will be understood that the definition of a rectangular jet exhaust gas opening also includes a square opening, rounded corners, or other similar modifications. FIG. 4 is an enlarged and more detailed aft end view of missile 10 illustrating the pair of two-dimensional plugs 14 and 14' in position within jet exhaust opening 12. As illustrated, both plugs are positioned for vectoring thrust in a manner for rolling or banking the missile in a clockwise direction about its longitudunal extent or axis. The plugs are adapted for controlled independent pivotal movement to various positions to impart desired roll and pitch to the missile. Jet exhaust opening 12 in missile 10 is defined by a frame comprised of pairs of opposed first walls 16 and 16', located on the top and bottom, and opposed second walls 18 and 18', located on opposite sides.

A pair of two-dimensional plugs 14 and 14' are pivotally mounted side-by-side about an axis defined by a shaft or similar mounting 20 located transversely between second walls 18 and 18'. Plugs 14 and 14' are of a truncated tear-drop shape symmetrical about a fore and aft plane lying in the axis of transverse shaft 20. Each plug is designed for high thrust and vectoring efficiency. The example shown has a cylindrical arc frontal section and planar aft sections inclined at about 20° to the plug centerline located on a plane passing through its pivotal axis. The aft section of each plug is truncated, as indicated by numerals 21 and 21', because jet exhaust gases flowing along the surface expand to a very low value, and the section, if extended, would not materially contribute to the thrust. Thrust is generated in the direction the plug frontal section is pointed, thus providing the desired thrust vectoring for the missile.

The plugs are referred to as two-dimensional plugs, meaning that their two dimensions in a transverse plane remains constant perpendicular to their transverse pivotal axes. The concept, however, is applicable to more general plug shapes. The plugs are mounted side-by-side about the axis of shaft 20 in a manner to allow each to be independently and individually pivoted by a control mechanism (represented by blocks 22 and 22') illustrated mounted on opposed walls 18 and 18'.

Figure 5:
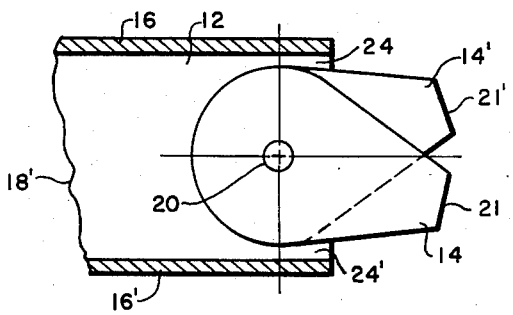
FIG. 5 is a partially sectionalized view through the missile illustrating the plugs pivoted in opposite positions to bank or roll the missile.
Figure 6:
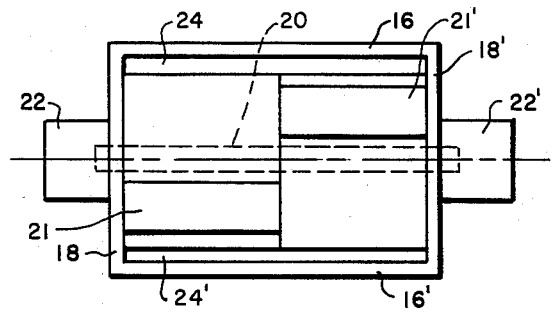
FIG. 6 is an aft end view of the jet exhaust area with plug nozzles in the positions illustrated in FIG. 5.

The plugs fill a substantial portion of the area of a generally rectangular jet exhaust opening 12, as illustrated in FIGS. 5 and 6, however, sections of each plug terminate short of first walls 16 and 16' to define exhaust nozzles 24 and 24' respectively. Nozzles 24 and 24' are of equal size, as illustrated in FIGS. 5 and 6 where the radius of curvature of each plug coincides with its pivotal axis. Therefore, there is equal thrust from exhaust openings on opposite sides of the nozzle when the plug is centered. Vectoring of the thrust is obtained when the plugs are pivoted out of their central fore and aft positions.

Figure 7:
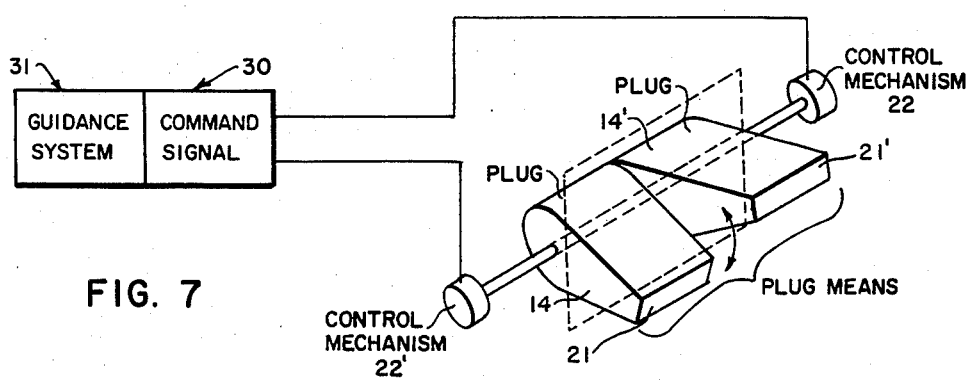
FIG. 7 is a representation of the plugs; control mechanism, command signal, and guidance system.

FIG. 7 is a representation of plugs 14 and 14' which are adapted to be selectively pivoted by control mechanism 22' and 22, respectively, under guidance through command signal 30, and guidance system 31.

By providing the plugs on opposite sides of the missile axis lying in the vertical plane, (note FIGS. 2 and 4) and pivoting them in opposite directions as illustrated in FIGS. 5 and 6, bank or roll is imparted to the missile. By pivoting both plugs up or down, pitch is imparted to the missile. Each plug is independently positioned by its respective control mechanism subject to command signals initiated from the guidance system.

To those skilled in the art, many modifications and variations of the present invention are possible in light of the above teachings. It is therefore to be understood that the present invention can be practiced otherwise than as specifically described herein and still be within the spirit and scope of the appended claims.

What is claimed is:

1. In a jet exhaust propelled missile, associated thrust vectoring apparatus for imparting bank and pitch to the missile for maneuvering it in flight, comprising:
    wall means defining a jet exhaust opening of generally rectangular cross section;
    plug means disposed within the jet exhaust opening for defining a plug nozzle therein;
    said plug means comprising a pair of generally two-dimensional plugs pivotally mounted in side-by-side adjacency on axes extending across the rectangular jet exhaust opening; and
    means responsive to guidance commands for selectively pivoting each plug independently about its axis for vectoring thrust of jet exhaust gasses passing through the defined plug nozzle;
    whereby, when the plugs are pivoted in opposite directions, the missile is caused to bank about its longitudinal extent, and when the plugs are both pivoted in the same direction the missile is caused to pitch about an axis transverse to its longititinal extent thereby providing maneuvering of the missile in flight.

2. The invention according to claim 1 wherein the pair of plugs are coaxially mounted.

3. The invention according to claim 2 wherein the pair of plugs are pivotally mounted on shaft means supported from walls which define the jet exhaust opening.

4. The invention according to claim 1 wherein the plugs are tear-drop shaped.

5. The invention according to claim 4 wherein the tear-drop shaped plugs are truncated at their downstream extremities.

6. The invention according to claim 2 wherein the plugs in addition to defining the nozzle further define turning vanes in the jet exhaust gases to provide moment on the missile.

7. The invention according to claim 2 wherein the plugs are located on opposite sides of a longitudinal axis of the missile.

8. A jet exhaust propelled missile having thrust vectoring apparatus for improved maneuvering characteristics in flight, comprising:
    wall means defining a rearwardly directed generally rectangular jet exhaust gas opening;
    said rearwardly directed opening equally disposed on opposite sides of a vertical plane which bisects the missile and extends longitudinally of the missile and contains the longitudinal axis thereof;
    plug means disposed between the walls defining the generally rectangular jet exhaust gas opening for defining a plug nozzle between the plug means and the wall means for the passage of exhaust gases therethrough;
    said plug means comprising a pair of generally two-dimensional tear drop shaped plugs each pivotally mounted in side-by-side adjacency on axes extending laterally across the opening;
    said plugs disposed on opposite sides of the vertical plane;
    means responsive to guidance commands for selectively pivoting each plug independently about its axis for vectoring thrust of the jet exhaust gases passing through the plug nozzle;
    whereby, when the plugs are pivoted to opposite directions, thrust vectoring of the exhaust gases cause the missile to roll about its longitudinal axis for imparting a bank thereto; and, when the plugs are both pivoted in the same direction, thrust vectoring of the exhaust gases causes the missile to pitch about an axis tranverse to the vertical plane for maneuvering the missile in flight.

9. The invention according to claim 8 wherein the generally rectangular jet exhaust gas opening has a dimension along one side which is approximately twice that along another side.

10. The invention according to claim 9 wherein the jet exhaust gas opening is disposed with its greater dimension lying transversely of the vertical plane.

11. An improved arrangement for maneuvering a missile in flight, comprising:
    a frame defining a rectangular opening for missile exhaust gases disposed on either side of a plane established vertically of an elongate missile body and containing its longtudinal axis;
    a pair of two-dimensional plugs positioned in side-by-side adjacency within the frame opening and disposed respectively on opposite sides of the plane to define a plug nozzle for exhaust gases passing therethrough;

said plugs pivotally mounted on axes extending across the frame opening and normal to the vertical plane;

said plugs adapted for independent pivotal positioning about their axes in response to missile guidance commands for vectoring exhaust gases passing through the nozzle;

whereby, when the plugs are pivoted to opposite directions, thrust vectoring of the exhaust gases causes the missile to roll about its longitudinal axis for imparting a bank thereto; and, when the plugs are both pivoted in the same direction, thrust vectoring of the exhaust gases causes the missile to pitch about an axis transverse to the vertical plane for maneuvering the missile in flight.

* * * * *